US005443737A

United States Patent [19]

Fjallstrom et al.

[11] Patent Number: 5,443,737

[45] Date of Patent: Aug. 22, 1995

[54] ROTARY DRUM WITH RADIAL SPRAY JETS

[75] Inventors: Roland Fjallstrom, Lawrenceville, Ga.; Rune Frykhult, Stockholm, Sweden; Charles Atkeison, Norcross, Ga.

[73] Assignee: Celleco Hedemora AB, Stockholm, Sweden

[21] Appl. No.: 966,195

[22] PCT Filed: Jul. 22, 1991

[86] PCT No.: PCT/SE91/00505

§ 371 Date: Mar. 26, 1993

§ 102(e) Date: Mar. 26, 1993

[87] PCT Pub. No.: WO92/02676

PCT Pub. Date: Feb. 20, 1992
(Under 37 CFR 1.47)

[30] Foreign Application Priority Data

Jul. 27, 1990 [SE] Sweden .............................. 9002516-4

[51] Int. Cl.[6] .............................................. B01D 33/06

[52] U.S. Cl. ................................. 210/360.1; 210/381; 210/393; 210/404; 210/412; 209/303; 209/497

[58] Field of Search ...................... 210/94, 359, 360.1, 210/360.2, 365, 367, 381, 391, 393, 394, 402, 403, 404, 411, 412; 209/303, 497

[56] References Cited

U.S. PATENT DOCUMENTS

| | | | |
|---|---|---|---|
| 1,926,402 | 9/1933 | Pearce . | |
| 2,165,807 | 7/1939 | Muphree et al. | 210/381 |
| 2,186,836 | 1/1940 | McLaughlin | 210/381 |
| 3,451,550 | 6/1969 | Cox | 210/381 |
| 4,210,539 | 7/1980 | Shiban | 210/391 |
| 4,563,273 | 1/1986 | Gessler | 210/94 |
| 5,008,010 | 4/1991 | Langner | 210/404 |
| 5,124,029 | 6/1992 | Fjallstrom et al. | 209/250 |

*Primary Examiner*—Robert A. Dawson
*Assistant Examiner*—W. L. Walker
*Attorney, Agent, or Firm*—Davis Hoxie Faithfull & Hapgood

[57] ABSTRACT

A separation device for suspensions comprises a housing (1), a filter body (3) with a wall of filter material situated in the housing, spray means (14) adapted to spray jets of a suspension to be separated directly onto one side of the wall of filter material, and means (4, 6) for displacing the filter body relative to the spray means. According to the invention the filter body forms a substantially circular cylindrical drum (3) with a vertical center axis, the circumferential wall of the drum comprises said wall of filter material. Further, said displacement means (4, 6) is adapted to turn said cylindrical drum about said vertical center axis during operation.

10 Claims, 5 Drawing Sheets

ROTARY DRUM WITH RADIAL SPRAY JETS

Figure 1:
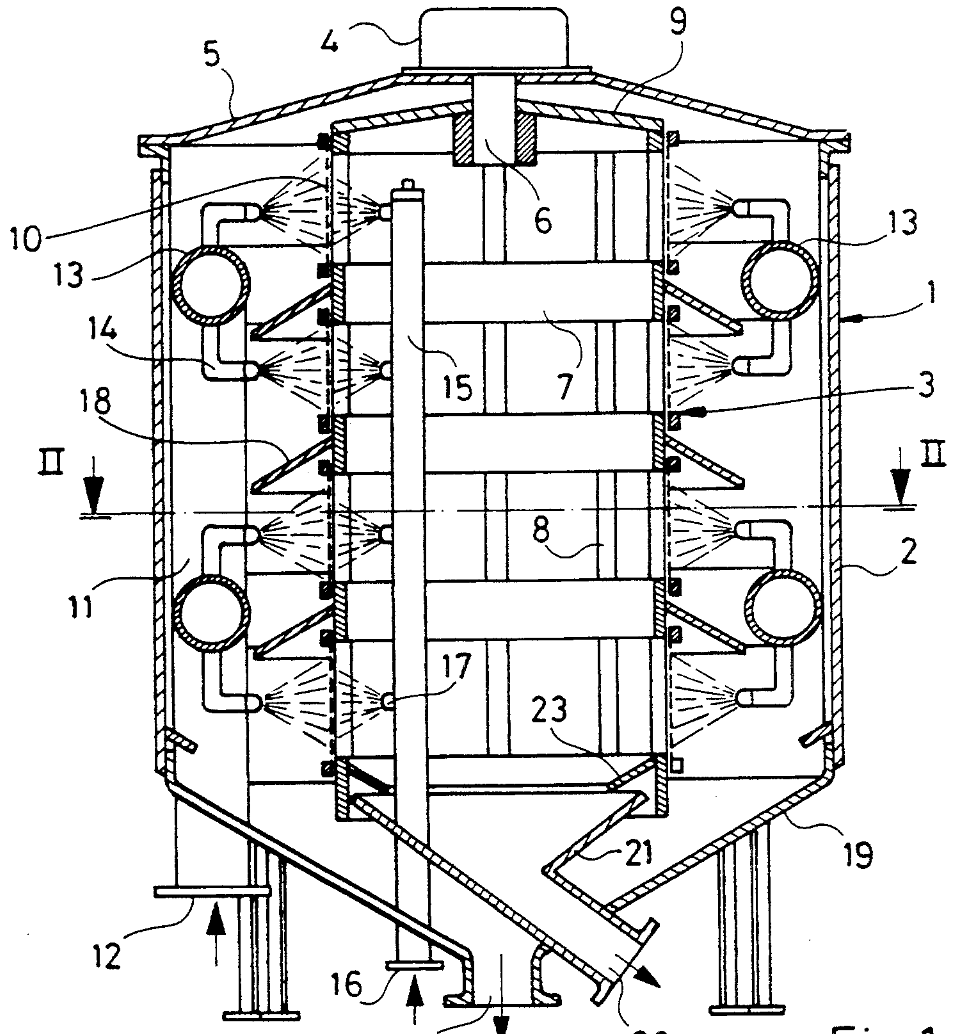

The present invention relates to a device for separating suspensions, preferably containing fibre pulp, comprising a housing, a filter body with a wall of filter material situated in the housing, spray means adapted to spray jets of a suspension to be separated directly onto one side of said wall of filter material, and means for displacing the filter body relative to said spray means. During operation the suspension is separated into a fine fraction, which passes through the filter material and which contains fine particles, and a coarse fraction, which does not pass through the filter material and which contains coarse particles and some fine particles.

In a known separation device of this kind according to SE 462 597, the filter body is arranged rotatably about a horizontal axis, the wall of the filter body being constituted by an annular vertical disc, which is coaxial with said horizontal axis. In order to enable the largest part as possible of the filter material of the known separation device to be utilized for the separation, the jets of suspension from the spray means have to hit the filter material at various distances from the centre of the annular disc. This means that the velocity of the filter material relative to said jets of suspension decreases the closer the centre of the annular disc the jets of suspension hit the filter material. In consequence the separation result will be different at different radial portions of the filter material, which is a drawback.

Another drawback with the known separation device is that coarse fraction created where jets of suspension hit upper portions of the filter material will flow downwards on the filter material disturbing the jets of suspension hitting lower situated portions of the filter material, with the result that the intended separation is deteriorated. It is true that the known separation device is provided with guide means intended to guide created coarse fraction away from the filter material. However, said guide means has proved to be inefficient, since it must be arranged stationary and spaced from the filter material. Thus, some coarse fraction can pass through the formed gap between the stationary guide means and the moving filter material and still disturb lower jets of suspension.

Yet another drawback with the known separation device is that its flow capacity is limited because of that it must be possible to check the condition of the filter material and the function of the spray means during operation. Thus, not more than two annular discs can be arranged coaxially with each other to enable a safe inspection of them and of the function of the spray means during operation. Such an inspection may be performed with the aid of inspection doors in the housing at mutual sides of the disc pair. The flow capacity of the known separation device may certainly be increased by increasing the diameter of the discs, but from practical reasons the diameter of the discs is limited to a maximum of about 4 meters. Nor would it be practical to increase the distance between adjacent discs to enable inspection between the discs during operation, whereby more than two discs could be installed, since in this case the space demand for the known separation device would substantially increase. The object of the present invention is to provide a separation device of the kind here present, which does not suffer from the above described drawbacks of the known separation device.

This object is obtained by means of a separation device of the kind mentioned initially, which primarily is characterized in that the filter body forms a substantially circular cylindrical drum with a vertical centre axis, the circumferential wall of the drum comprising said wall of filter material, and that said displacement means is adapted to turn said cylindrical drum about said vertical centre axis during operation.

Hereby the advantage is obtained that the entire filter material will have substantially constant velocity relative to the jets of suspension from the spray means during operation, whereby a substantially similar separation result is achieved all over the filter material. Besides, the entire filter material may easily be inspected during operation, suitably by means of transparent wall portions of the housing. A further advantage is that the capacity of the new separation device may be dimensioned by suitably choosing both the height of the drum (up to a maximum of about 4 m) and the diameter of the drum. This results in that the available floor space can be utilized more efficiently by means of a separation device according to the invention, as compared to the above described known separation device. As noted above, the dimensioning of the known device is limited to the choice of the diameter of the discs, i.e. the height of the known device.

The spray means for suspension are suitably adapted to spray the outside of the circumferential wall of the drum. In this case spray means for cleansing liquid, such as water, may be adapted to spray the inside of the circumferential wall of the drum.

As an alternative the spray means for suspension may be adapted to spray the inside of the circumferential wall of the drum, whereas spray means for cleansing liquid are adapted to spray the outside of the circumferential wall of the drum. In this alternative the advantage is obtained that the function of individual spray members of the spray means for suspension easily can be checked indirectly during operation by inspection of the jets of fine fraction, which are created on the outside of the circumferential wall of the drum in front of the respective spray members. Should such a jet of fine fraction cease during operation, this is thus an indication on that the corresponding spray member is plugged.

Advantageously, guide means is arranged around the drum and extends outwards and downwards from the circumferential wall of the drum radially past the spray means for suspension, the guide means being attached to the drum. All of the coarse fraction, which during operation is created on the circumferential wall of the drum above said guide means and which flows downwards, is hereby guided away from the circumferential wall of the drum by the guide means and is prevented from disturbing the jets of suspension which hit the circumferential wall of the drum below the guide means.

According to an embodiment of the separation device according to the invention, the interior of the housing is divided by partition walls into at least two separation chambers, through which the circumferential wall of the drum extends, said spray means for suspension being adapted to spray jets of a suspension to be separated within each separation chamber, such that the jets of suspension hit the circumferential wall of the drum. Said partition walls may be arranged such that the separation chambers are formed in series either in the circumferential direction of the drum or in the axial direction of the drum. The separation chambers may be utilized for providing multi stage separation, i.e. coarse fraction created in one separation chamber may be separated further by spraying it onto the circumferential wall of the drum in another separation chamber. As an alternative the separation chambers may be utilized independently of each other for separating suspensions of quite different kinds.

Figure 2:
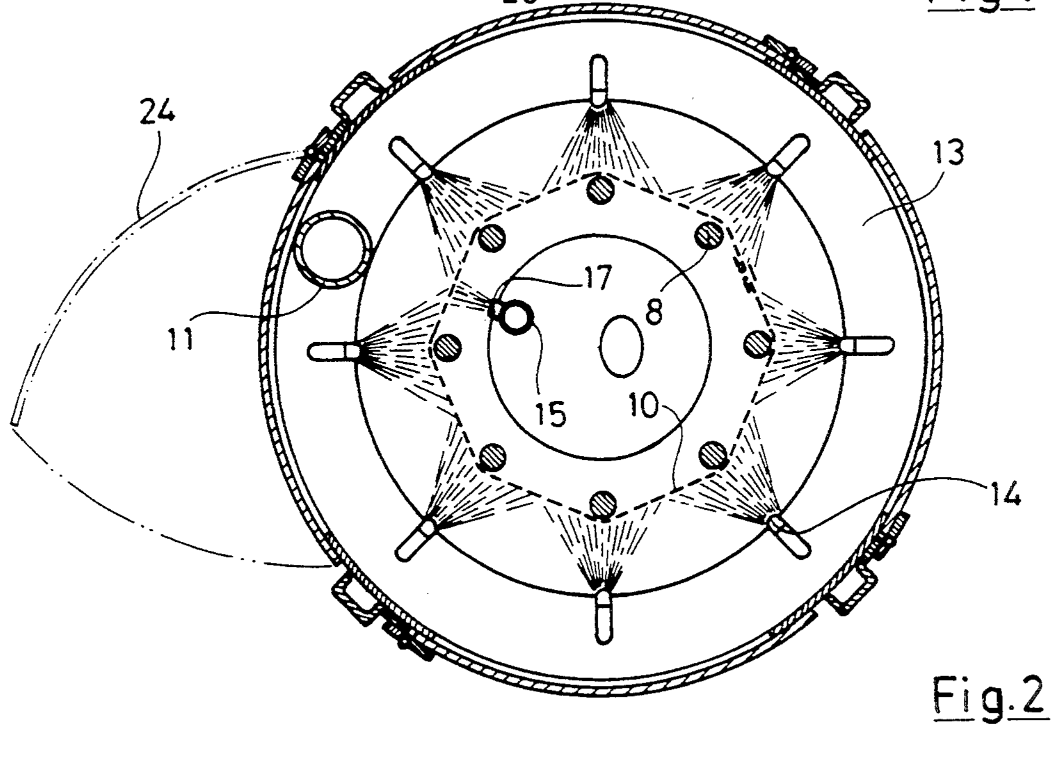
Figure 3:
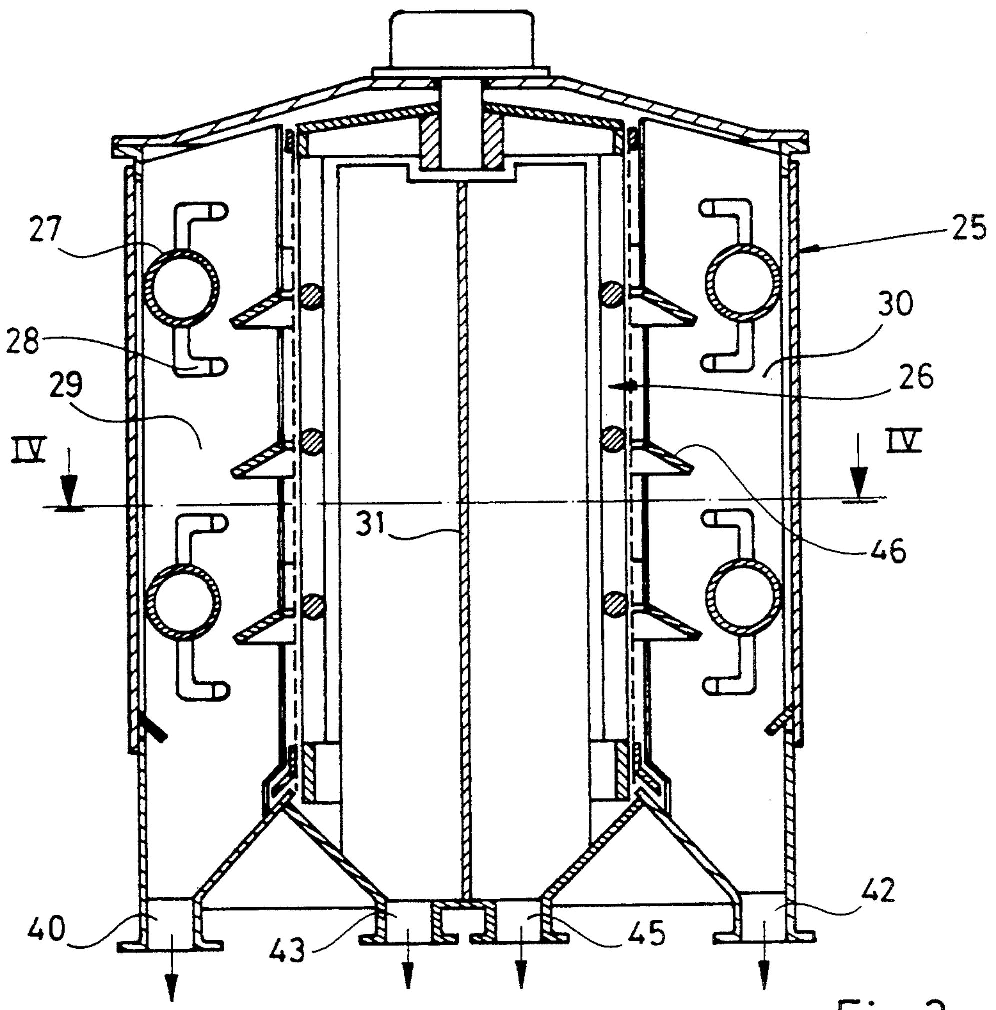
Figure 4:
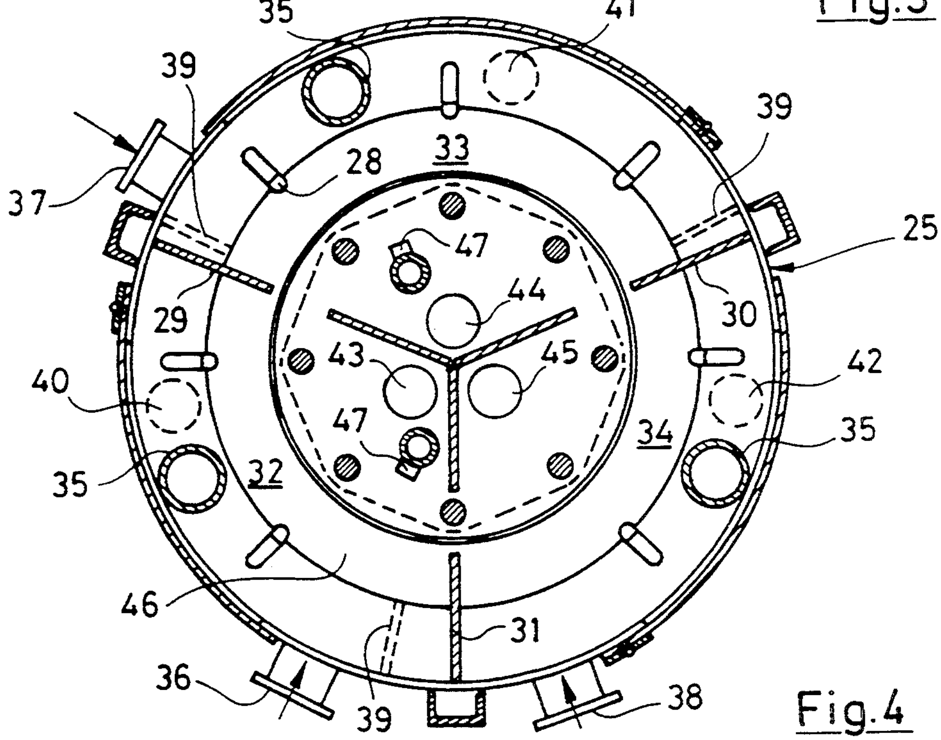
Figure 5:
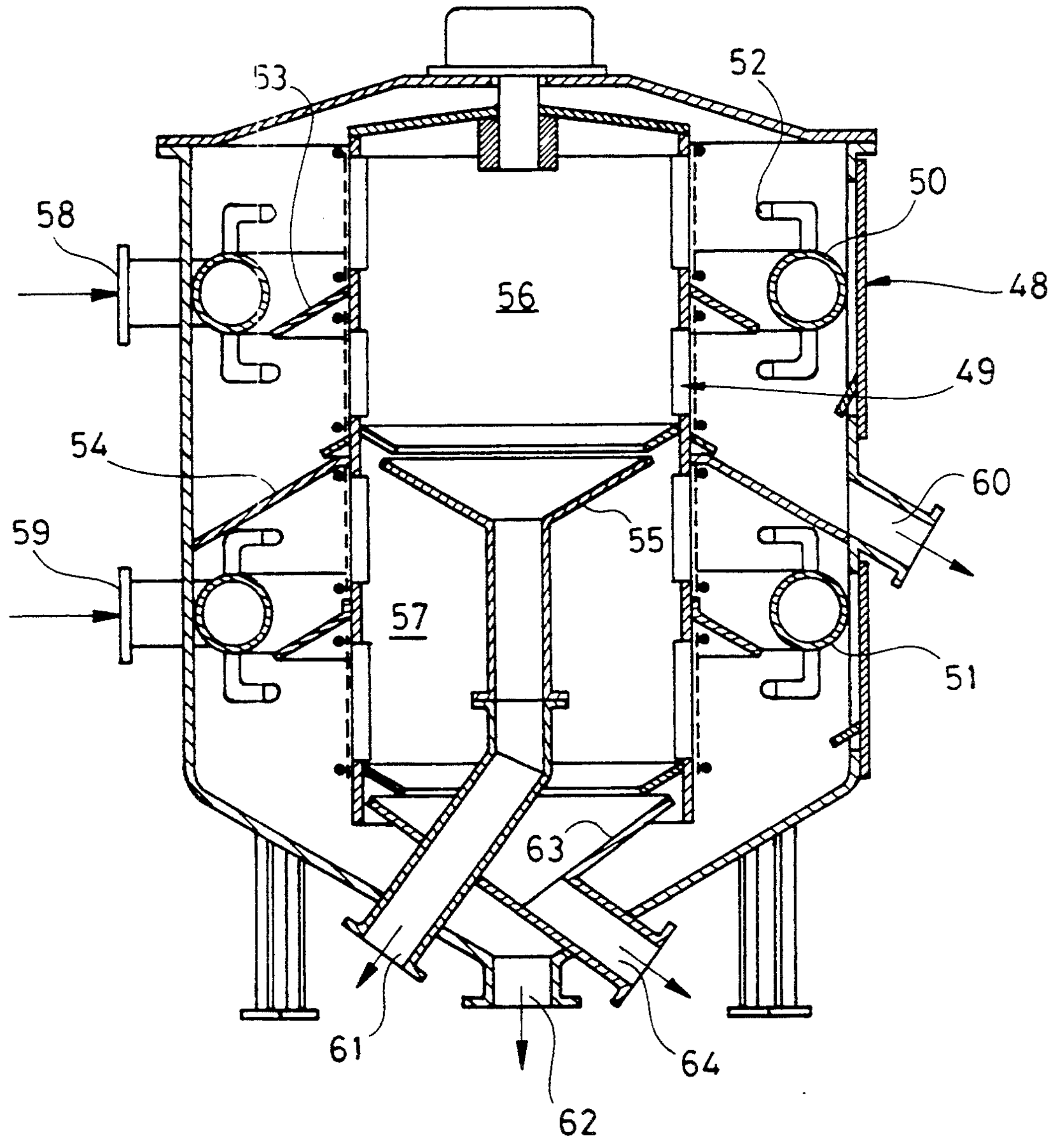
Figure 6:
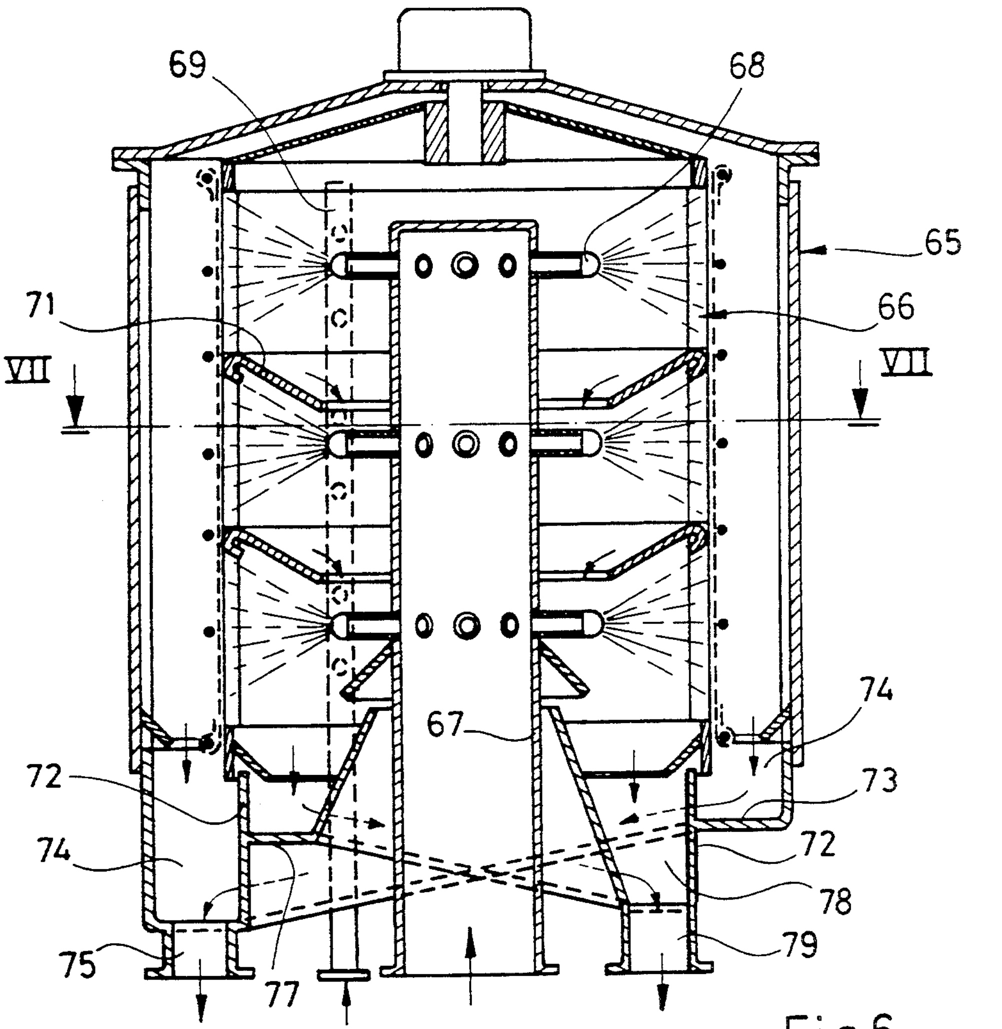
Figure 7:
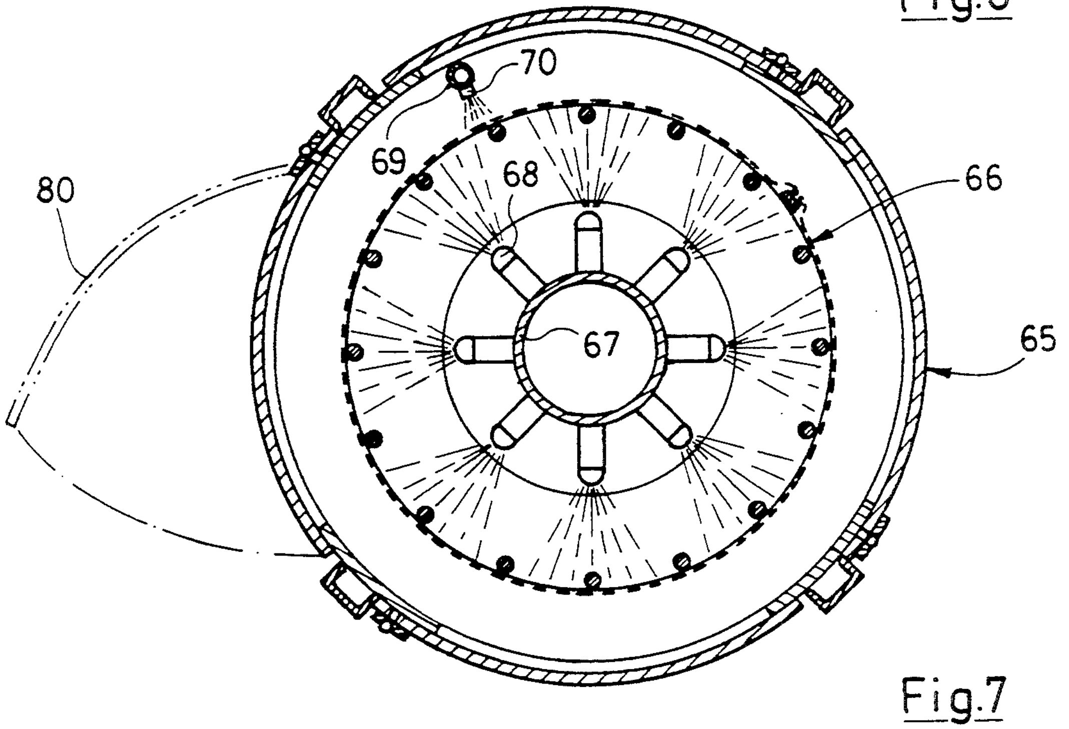
Figure 8:
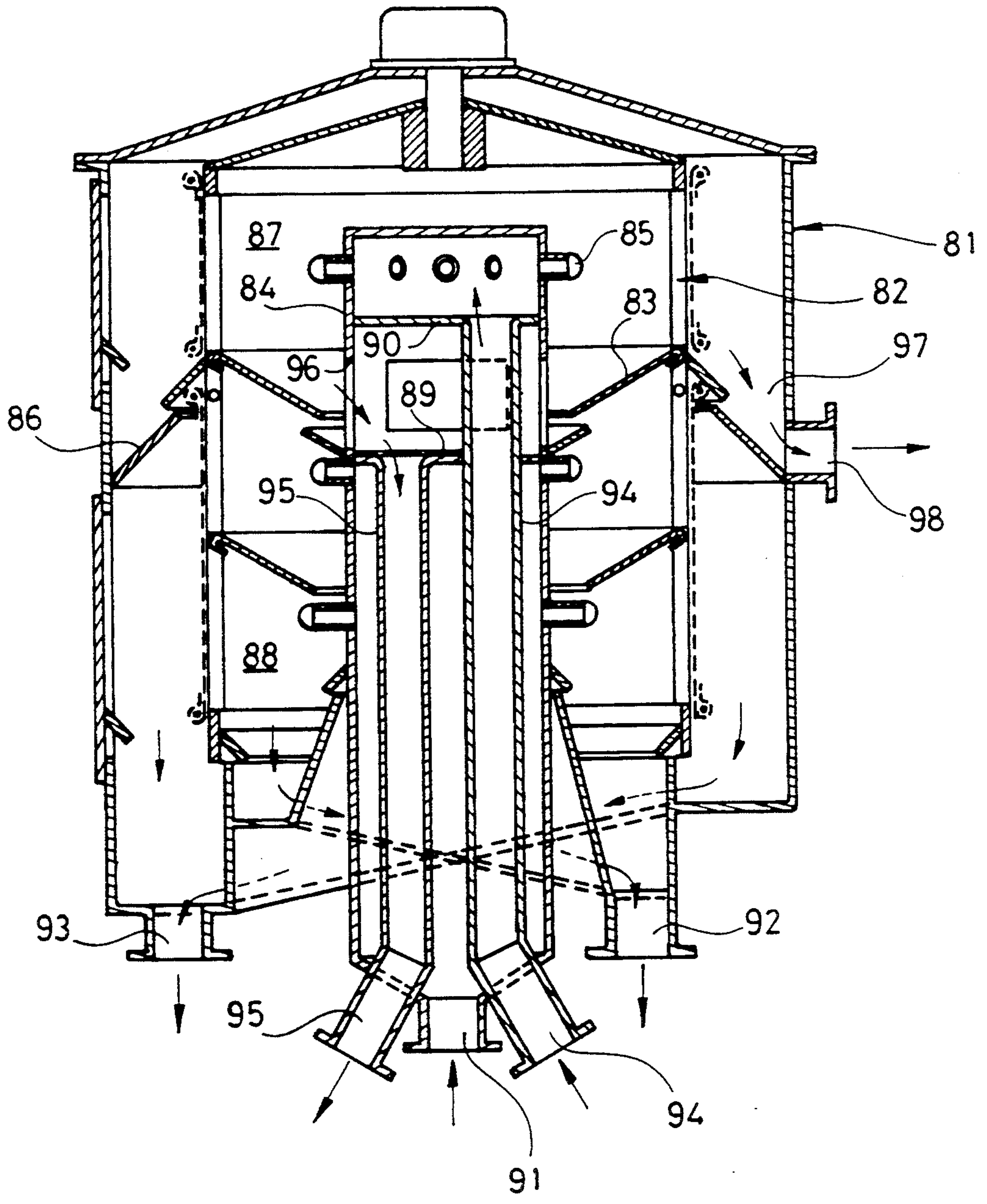

The invention is explained more closely in the following with reference to the accompanying drawings, in which FIG. 1 shows a vertical sectional view through a first embodiment of the separation device according to the invention, FIG. 2 shows a section along the line II—II in FIG. 1, FIG. 3 shows a vertical sectional view through a second embodiment of the separation device according to the invention, FIG. 4 shows a section along the line IV—IV in FIG. 3, FIGS. 5 and 6 show vertical sectional views through third and fourth embodiments, respectively, of the separation device according to the invention, FIG. 7 shows a section along the line VII—VII in FIG. 6, and FIG. 8 shows a vertical sectional view through a fifth embodiment of the separation device according to the invention.

The separation device shown in FIG. 1 comprises a circular cylindrical housing 1 with a vertical mantle wall 2. A filter body in the form of a drum 3 is situated in the housing 1 coaxially with the latter. A motor 4 is attached to an upper gable wall 5 of the housing 1 and has a drive shaft 6, from which the drum 3 is suspended such that the drum 3 is turned about its centre axis when the motor 4 is activated.

The drum 3 comprises a frame-work formed by five annular elements 7, which are located coaxially with and spaced from each other, and eight axial bar elements 8, to which the annular elements 7 are attached. The upper element 7 is via a gable wall 9 attached to the drive shaft 6. Between the annular elements 7 of each pair of adjacent annular elements 7 a filter cloth 10 is fastened, which is supported by the bar elements 8 and which forms the circumferential wall of the drum 3 with a cross-section having the form of an equilateral octahedron. Thus, the cross-section of the circumferential wall of the drum 3 is substantially circular. The cross-section of the drum's 3 circumferential wall may be made more close a pure circular shape if additional bar elements 8 were arranged. However, in such a case the effective filtering area of the filter cloth would decrease.

A stationary pipe 11 with an inlet 12 for a suspension to be separated extends into the housing 1 outside and axially along the drum 3. The pipe 11 is connected to two horizontal distribution pipes 13, which extend around the drum 3. Each distribution pipe 13 is provided with an upper row and a lower row of spray members 14, each row including eight members 14. The spray members 14 are evenly distributed around the drum 3 for spraying the filter cloths 10 with suspension.

A stationary vertical pipe 15 with an inlet 16 for cleansing liquid extends from below into and axially along the drum 3. The pipe 15 is provided with four spray members 17 for spraying the filter cloths 10 with cleansing liquid.

Three annular guide members 18 are attached to the circumferential wall of the drum 3 coaxially with the drum 3 and extend outwards from the drum 3 in direction downwards a distance radially past the spray members 14 for suspension. Each guide member 18 is situated between two adjacent rows of said upper and lower rows of spray members 14.

The housing 1 is provided with a bottom wall 19, which has a coarse fraction outlet 20 for a created coarse fraction. A collection chute 21 with a fine fraction outlet 22 for a created fine fraction extends a distance into the drum 3 from the lower end of the drum 3. Close to the lower end of the drum 3 the drum 3 is provided with an annular guide member 23, which extends inwards from the circumferential wall of the drum 3 in direction downwards for guiding created fine fraction away from the circumferential wall of the drum 3 to the collection chute 21.

The mantle wall 2 comprises four doors 24 for enabling inspection and maintenance of the interior of the housing 1.

During operation of the separation device according to FIG. 1 the drum 3 is rotated by the motor 4 while suspension to be separated is supplied via the inlet 12, the pipe 11 and the distribution pipes 13 to the spray members 14. The jets of suspension from the spray members 14 hit the filter cloths 10, whereby a major part of the liquid and a major part of the finer particles in the suspension pass the screen holes of the filter cloths 10 and are discharged from the separation device via the collection chute 21 and the fine fraction outlet 2, while the coarser particles and a minor part of the liquid and a minor part of the finer particles are discharged from the separation device via the coarse fraction outlet 20. The guide members 18 guide created coarse fraction away from the circumferential wall of the drum 3 to spaces located radially outside the spray members 14, as seen from the drum 3, whereby the function of the jets of suspension from the spray members 14 are not disturbed by downwards flowing coarse fraction created from upper jets of suspension. The filter cloths 10 are continuously cleansed (alternatively discontinuously) by means of cleansing liquid, which is sprayed onto the by-passing insides of the filter cloths 10 by the spray members 17.

The separation device shown in FIG. 3 comprises a housing 25, a drum 26, two distribution pipes 27 and spray members 28 in principle of the same kind as in the above described separation device according to FIG. 1. Three vertical partition walls 29-31 extend radially outwards from the centre of the housing 25 and divide the interior of the housing 25 into three separation chambers 32-34, the partition walls 29-31 having axially extending disruptions, through which the circumferential wall of the drum 26 can freely move.

In each separation chamber the lower distribution pipe 27 is connected to the upper one via a vertical connection pipe 35. Each distribution pipe 27 is provided with three partition walls 39 situated close to the three vertical partition walls 29-31, respectively, as seen in the circumferential direction of the drum 26.

The lower distribution pipe 27 is provided with an inlet 36 for supplying suspension to the spray members 28 in the separation chamber 32, an inlet 37 for supplying suspension to the spray members 28 in the separation chamber 33, and an inlet 38 for supplying suspension to the spray members 28 in the separation chamber 34.

At the bottom of the housing 25 the separation chambers 32-34 have respective coarse filtrate outlets 40-42 and respective fine filtrate outlets 43-45.

Three annular guide members 46 are arranged around the drum 26 coaxially with the latter for guiding created coarse fraction away from the circumferential wall of the drum 26. In this case the guide members 46 are attached to the partition walls 29-31 and are located somewhat spaced from the circumferential wall of the drum 26. However, as an alternative the guide members 46 may be attached directly to the drum 26 in the same manner as described above in connection with the separation device according to FIG. 1.

Spray members 47 for cleansing liquid are arranged in the drum 26 in the separation chambers 32 and 33. As an alternative, also the separation chamber 34 may be provided with spray members for cleansing liquid.

The separation device according to FIG. 3 may be utilized for separating a suspension in three stages. Obtained coarse fraction from the coarse fraction outlet 40 from the separation chamber 32 may for instance be pumped into the inlet 37 of the separation chamber 33, whereafter obtained coarse fraction from the coarse fraction outlet 41 of the separation chamber 33 in turn is pumped into the inlet 38 of the separation chamber 34. The final coarse fraction obtained from the coarse fraction outlet 42 of the separation chamber 34 will have a low concentration of finer particles. As an alternative the separation chambers 32-34 may be utilized independently of each other for separating three suspensions of different kinds.

The separation device shown in FIG. 5 comprises a housing 48, a drum 49, two distribution pipes 50, 51, spray members 52 and guide members 53 in principle of the same kind as in the above described separation device according to FIG. 1. A partition wall 54 in the housing 48 surrounds the drum 49 and at the level of the partition wall 54 there is a stationary collection chute 55 in the drum 49 for collecting fine filtrate. The partition wall 54 and the collection chute 55 divides the interior of the housing 48 into an upper separation chamber 56 and a lower separation chamber 57.

The distribution pipes 50 and 51 have inlets 58 and 59, respectively, for suspensions to be separated in the separation chambers 56 and 57. The upper separation chamber 56 communicates with a coarse fraction outlet 60 for created coarse fraction and via the collection funnel 55 with a fine fraction outlet 61 for created fine fraction, whereas the lower separation chamber 57 communicates with a coarse fraction outlet 62 for created coarse fraction and via a collection chute 63 with a fine fraction outlet 64 for created fine fraction.

The separation device according to FIG. 5 may be utilized for separating a suspension in two stages, whereby the obtained coarse fraction from for instance the coarse fraction outlet 60 of the separation chamber 56 is pumped into the inlet 59 of the lower separation chamber 57. As an alternative the separation chambers 56 and 57 may be utilized independently of each other for separating two suspensions of different kinds.

The separation device shown in FIG. 6 comprises a housing 65 and a rotatable drum 66 in principle of the same kind as in the above described separation device according to FIG. 1. A vertical distribution pipe 67 for a suspension to be separated extends through the bottom of the housing 65 centrally into the drum 66. The distribution pipe 67 is provided with three rows of spray members 68, eight members 68 per row. The spray members 68 are evenly distributed around the distribution pipe 67 for spraying the inside of the circumferential wall of the drum 66.

A vertical pipe 69 for cleansing liquid extends through the bottom of the housing 65 into the housing 65 outside the drum 66. The pipe 69 is provided with spray members 70 for spraying the outside of the drum 66 with cleansing liquid.

Two annular guide members 71 for guiding away created coarse fraction are attached to the circumferential will of the drum 66 coaxially with the drum 66 and extend inwards in the drum 66. Each guide member 71 is situated between two adjacent rows of said rows of spray members 68.

A vertical circular wall 72 of somewhat less diameter than the drum 66 is arranged at the bottom of the housing 65 coaxially with the drum 66 and forms together with the circumferential wall of the housing 65 and a bottom wall 73 an annular channel 74 for collecting created fine fraction. The channel 74 communicates with a fine filtrate outlet 75. A wall 76 with the shape of a truncated cone surrounds the distribution pipe 67 and forms together with the wall 72 and a bottom wall 77 an annular channel 78 for collecting created coarse fraction. The channel 78 communicates with a coarse fraction outlet 79.

The circumferential wall of the housing 65 comprises four transparent inspection doors 80.

During operation of the separation device according to FIG. 6 the transparent inspection doors 80 enable inspection of the fine fraction flow created through the circumferential wall 66 in front of each spray member 68. From the size of said fine fraction flow an indication is obtained whether the spray member 68 has been completely or partly plugged, or if a damage has arisen on the filter material of the circumferential wall of the drum 66.

The separation device shown in FIG. 8 comprises a housing 81, a rotatable drum 82, two guide members 83, a central distribution pipe 84 and spray members 85 in principle of the same kind as in the above described separation device according to FIG. 6. A partition wall 86 in the housing 81 surrounds the drum 82 at the level of the upper guide member 83. The partition wall 86 and the upper guide member 83 divide the interior of the housing 81 into an upper separation chamber 87 and a lower separation chamber 88. In the distribution pipe 84 there are two partition walls 89, 90 between the upper and the two lower rows of spray members 85.

An inlet 91 for suspension to be supplied to the lower separation chamber 87 via spray members 85 in the latter, and outlets 92 and 93 for coarse fraction and fine fraction, respectively, from the lower separation chamber 87 are arranged in the same manner as described above in connection with the separation device according to FIG. 6. An inlet pipe 94 for a suspension to be separated in the upper separation chamber 87 extends from below into the distribution pipe 84 through the partition walls 89, 90 and opens into the distribution pipe 84 above the upper partition wall 90. A discharge pipe 95 for coarse fraction from the upper separation chamber 87 extends in the distribution pipe 84 downwards from the interior of the distribution pipe 84 between the partition walls 89, 90 and opens below the distribution pipe 84. The interior of the discharge pipe 95 communicates with the upper separation chamber 87 via holes 96 in the distribution pipe 84 situated axially between the partition walls 89, 90.

The partition wall 86 inclines outwards from the drum 82 and forms with the circumferential wall of the housing 81 a channel 97 for collecting fine filtrate from the upper separation chamber 87. The channel 97 communicates with a fine filtrate outlet 98.

The separation device according to FIG. 8 may be utilized for separating a suspension in two stages, whereby obtained coarse fraction from for instance the coarse fraction outlet 92 of the lower separation chamber 88 is pumped into the inlet pipe 94 of the upper separation chamber 87. As an alternative the separation chamber 87 and 88 may be utilized independently of each other for separating two suspensions of different kinds.

Further separation chambers in the separation device according to FIG. 6 may also be provided by means of vertical partition walls in principle in the same manner as described above in connection with the separation device according to FIG. 3.

We claim:

1. A device for separating suspensions, comprising:

a housing, a substantially circular cylindrical drum arranged in the housing and having a circumferential wall of filter material extending around a vertical central axis of the drum, means for turning the drum about said vertical central axis, spray means positioned to spray jets of a suspension to be separated in a radial direction generally transverse to said vertical central axis and directly onto one side of said circumferential wall, whereby said jets of suspension hit the filter material and are separated into a fine fraction, which passes through the filter material and which contains fine particles, and a coarse fraction, which does not pass through the filter material and which contains coarse particles and some fine particles, and means forming an outlet for discharging said coarse fraction from the device.

2. A device according to claim 1, wherein the interior of the housing is divided by partition walls into at least two separation chambers, through which the circumferential wall of the drum extends, said spray means being adapted to spray jets of the suspension to be separated within each separation chamber, such that the jets of the suspension hit the circumferential wall of the drum.

3. A device according to claim 2, wherein said partition walls are arranged such that the separation chambers are formed in series in the circumferential direction of the drum.

4. A device according to claim 2, wherein said partition walls are arranged such that the separation chambers are formed in series in the axial direction of the drum.

5. A device according to claim 1, wherein said spray means for suspension are adapted to spray the outside of the circumferential wall of the drum.

6. A device according to claim 5, further comprising spray means for cleansing liquid adapted to spray the inside of the circumferential wall of the drum.

7. (Twice Amended) A device according to claim 1, wherein the spray means for the suspension are adapted to spray the inside of the circumferential wall of the drum.

8. A device according to claim 7, further comprising spray means for cleansing liquid arranged to spray the outside of the circumferential wall of the drum.

9. A device according to claim 1, further comprising guide means arranged around the drum and extending outwardly and downwardly from the circumferential wall of the drum radially past the spray means for the suspension, for guiding the created coarse fraction away from the circumferential wall of the drum.

10. A device according to claim 9, wherein the guide means are attached to the drum.

* * * * *